United States Patent
Bouchet

(10) Patent No.: US 12,374,178 B2
(45) Date of Patent: Jul. 29, 2025

(54) COMMUNICATION METHOD USING ELECTRONIC BADGES COMMUNICATING WITH BEACONS

(71) Applicant: SCAN-MATCH, Paris (FR)

(72) Inventor: Antoine Bouchet, Paris (FR)

(73) Assignee: SCAN-MATCH, Paris (FR)

( * ) Notice: Subject to any disclaimer, the term of this patent is extended or adjusted under 35 U.S.C. 154(b) by 20 days.

(21) Appl. No.: 18/355,138

(22) Filed: Jul. 19, 2023

(65) Prior Publication Data
US 2024/0029492 A1  Jan. 25, 2024

(30) Foreign Application Priority Data
Jul. 20, 2022  (FR) ...................................... 2207446

(51) Int. Cl.
*G07C 9/28* (2020.01)
*G06K 7/14* (2006.01)
*G07C 9/27* (2020.01)
*G07C 9/29* (2020.01)

(52) U.S. Cl.
CPC ............. *G07C 9/28* (2020.01); *G06K 7/1413* (2013.01); *G07C 9/27* (2020.01); *G07C 9/29* (2020.01)

(58) Field of Classification Search
None
See application file for complete search history.

(56) References Cited

U.S. PATENT DOCUMENTS

| | | | | |
|---|---|---|---|---|
| 11,328,546 B2* | 5/2022 | Hogg | ................. | G07C 9/00309 |
| 11,736,541 B2* | 8/2023 | Goel | .................... | H04L 12/1822 709/204 |
| 2006/0200676 A1* | 9/2006 | Koeppen | ............. | G06F 21/6245 370/352 |
| 2010/0013762 A1* | 1/2010 | Zontrop | .................. | A63F 13/85 345/156 |
| 2016/0080364 A1* | 3/2016 | Karimzadeh | ......... | G06F 21/606 726/6 |
| 2017/0104735 A1* | 4/2017 | Brown | .................. | H04L 63/061 |
| 2018/0152252 A1* | 5/2018 | Whatmough | .......... | H04B 1/385 |
| 2018/0225900 A1* | 8/2018 | Wishne | ................. | H04W 12/50 |
| 2019/0050608 A1 | 2/2019 | Gonzalez et al. | | |
| 2020/0342364 A1 | 10/2020 | Ives-Halperin et al. | | |
| 2022/0398887 A1* | 12/2022 | Pandey | .............. | G06K 19/0723 |

OTHER PUBLICATIONS

FR 2207446, INPI Rapport de Recherche Preliminaire, Feb. 2, 2023, 2 pages.

* cited by examiner

*Primary Examiner* — Carlos Garcia
(74) *Attorney, Agent, or Firm* — Soquel Group LLC

(57) ABSTRACT

A communication method is intended for being used during a public meeting. The method includes positioning of a mobile beacon in a zone, the beacon issuing within the zone, a signal specific to the zone, storage in a memory of the badge of each participant of an identifier and personal data of the participant, the badge displaying some of the personal data of the participant, detection by the badge of the signal issued by the beacon, when the badge has detected the beacon, exchange of information between the beacon and the badge, and/or display on the badge of personal data relating to the zone.

13 Claims, 3 Drawing Sheets

COMMUNICATION METHOD USING ELECTRONIC BADGES COMMUNICATING WITH BEACONS

REFERENCE TO RELATED APPLICATIONS

This application is a U.S. non-provisional application claiming the benefit of French Application No. 22 07446, filed on Jul. 20, 2022, the contents of which are incorporated herein by reference in their entirety.

TECHNICAL FIELD OF THE INVENTION

The present invention relates to a communication method using electronic badges during a public meeting, the badges exchanging information with beacons present at the public meeting venue.

BACKGROUND OF THE INVENTION

During some public meetings, participants are required to wear badges mentioning the identity thereof. In this way, event organizers can quickly check the identity of a participant, and also the different participants are able to exchange more easily with each other.

It is possible to use electronic badges, which include a chip including a badge identifier. Such chip allows the participant to identify themselves by simply presenting their badge, e.g. to enter a controlled access zone.

In the case of a controlled access zone, an access-limiting device comprises, in a database, information relating to the participant, in particular the identifier of the badge thereof and the right of access thereof.

A badge reader on the access limiting device scans the badge and reads the identifier. By querying the database linked to the device, a microprocessor within the access-limiting device determines whether the participant has the right to access the zone. The device then displays the result so as to be visible for the participant.

However, for an electronic badge to display the identity of a participant, the identity has to be permanently inscribed on the badge. The above has the disadvantage of having to redo a badge for each new participant in the public meeting. However, some meetings are exceptional events and the participant will not subsequently reuse the badge. The above thus carries an additional cost and the creation of waste.

In addition, the electronic badge does not allow the participant to receive information relating to the right of access thereof, other than by interrogating the device.

SUMMARY OF THE INVENTION

A goal of the invention is thus to propose a badge which is more convenient to use.

To this end, the invention relates to a communication method for a public meeting using electronic identification badges each associated with a participant, characterized in that the method comprises the following steps:
  positioning of a mobile beacon in a determined zone of the public meeting, the beacon issuing within said determined zone, an issued signal specific to the determined zone;
  storage in a memory of the badge of each participant and of an identifier and of personal data of the participant, the badge displaying some of the personal data, such as name and photo, of the participant allowing other participants to identify said participant,
  the method further comprising the following steps when the participant is in said zone:
  detection by the badge of the signal issued by the beacon;
  when the badge has detected the beacon, exchange of information between the beacon and the badge, and/or display on the badge of personal data with regard to the zone.

Since each beacon is specific to a determined zone, the exchanges between the badge and each beacon can be different depending on the zone. In this way it is possible to provide a wide variety of services, using the same device.

Participants are visually identifiable by the badge thereof, which facilitates the exchange of information between different participants and/or between a participant and an organizer of the public meeting.

The detection of the beacon signal by the badge is convenient since same makes unnecessary, infrastructures such as smart card reader, which are bulky and expensive.

The storage of information in an electronic badge memory allows the participant to access such information without having to consult a badge reader or an electronic device such as a tablet or a computer communicating with a database. The participant is thus autonomous.

Moreover, for organizers of the public meeting, the above makes it possible to have a double confirmation by comparing the information stored in the badge and the information in a beacon.

The comparison between the information stored in the badge and the information in the beacon is facilitated by the display of the personal data relating to the zone on the badge, visible to the organizers.

The communication method can further have one or a plurality of the following features, considered individually or in all technically possible combinations:
  the exchange of information between the beacon and the badge comprises:
    transfer of the identifier of the participant to the beacon, via the badge;
  the exchange of information between the beacon and the badge comprises:
    transmission of information from the beacon to the badge for modification of the badge memory;
  the beacon uploads participant information to a database;
  the badge also transfers to the beacon, personal data of the participant, in particular the access rights thereof to the determined zone;
  the badge includes a display on which the personal data of the participant is displayed;
  the determined zone is a badge initialization zone, the badge being initialized before the storage in the memory of the badge of each participant of an identifier and of personal data of the participant, by following the following steps:
    display of a barcode on the display;
    scan of the barcode by a barcode reader integrated into the beacon; and
    transmission of personal data from the beacon to the badge;
  the determined zone is an access control zone, the signal issued by the beacon containing the identifier of the place, the badge after receiving the signal from the beacon displaying personal data, and information relating to the right of access of the participant to said zone;
  the badge comprises a LED diode controlled by a microprocessor in the electronic badge, the color of the diode characterizing the right of access of the participant to the zone;

the determined zone is a coatroom and the information transmitted from the beacon to the badge includes a coatroom ticket number to be entered into the memory of the badge as personal data;

the determined zone is a badge return zone and following the uploading of the information from the beacon to the database, the badge is placed in a returned state, a state requiring initialization before the next use of the badge;

prior to the positioning of a mobile beacon, at least two badges exchange data by following the following steps:

bringing at least two badges closer to one another;

issuance by each badge of a badge identification signal;

interception by each badge of signals from other nearby badges;

once the at least two signals are detected, exchange of personal data, including virtual business cards, between the at least two badges; and recording in the memory of personal data exchanged in the badge memories;

the determined zone is a catering reception zone, the information transmitted from the beacon to the badge containing a catering credit for being written in the memory of the badge as personal data.

BRIEF DESCRIPTION OF THE DRAWINGS

Other features and advantages of the invention will be clear from the description thereof which is given below as an example, but not limited to, with reference to the enclosed figures, among which.

DETAILED DESCRIPTION

Figure 1:
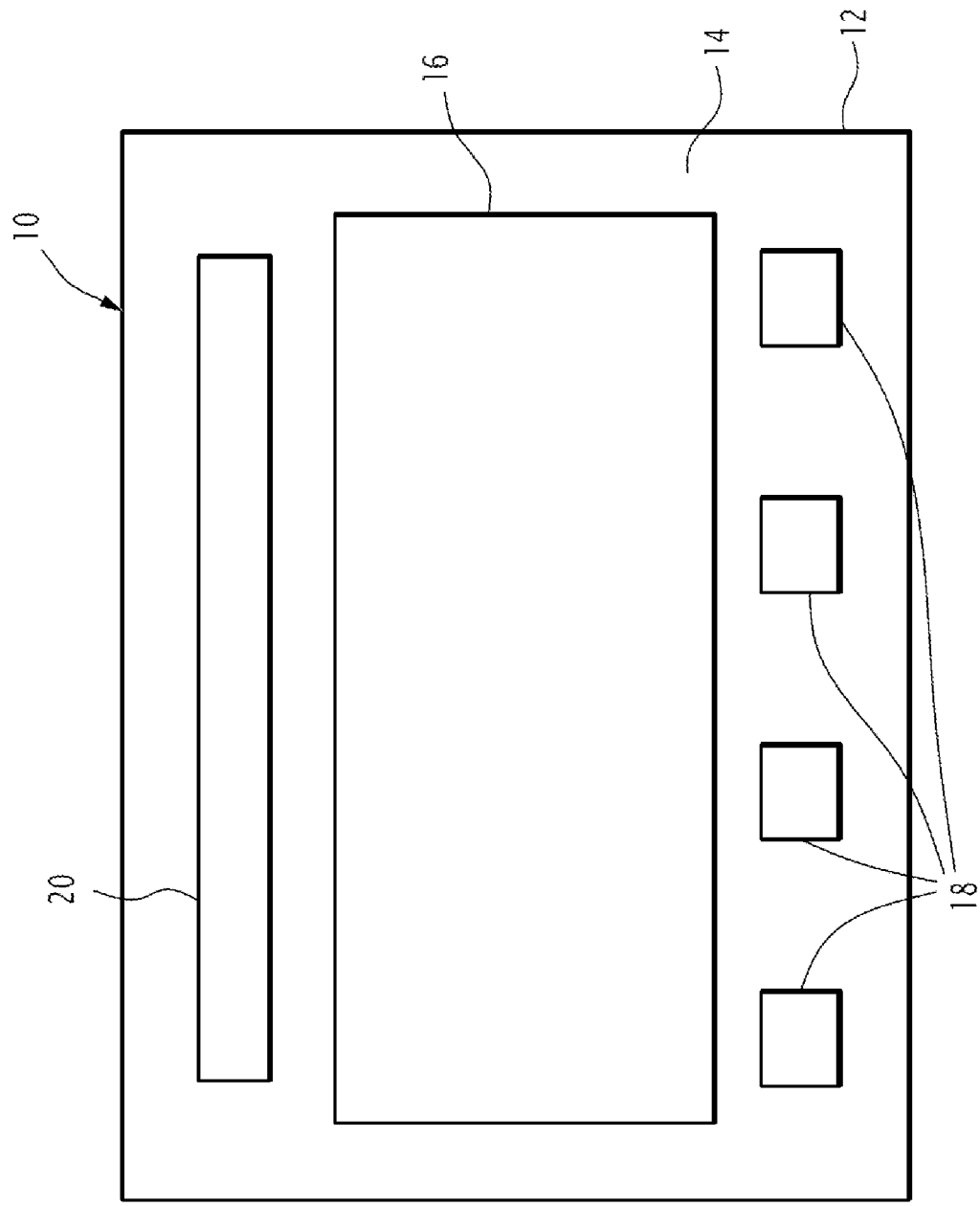
FIG. 1 is a front view of an electronic badge.
Figure 2:
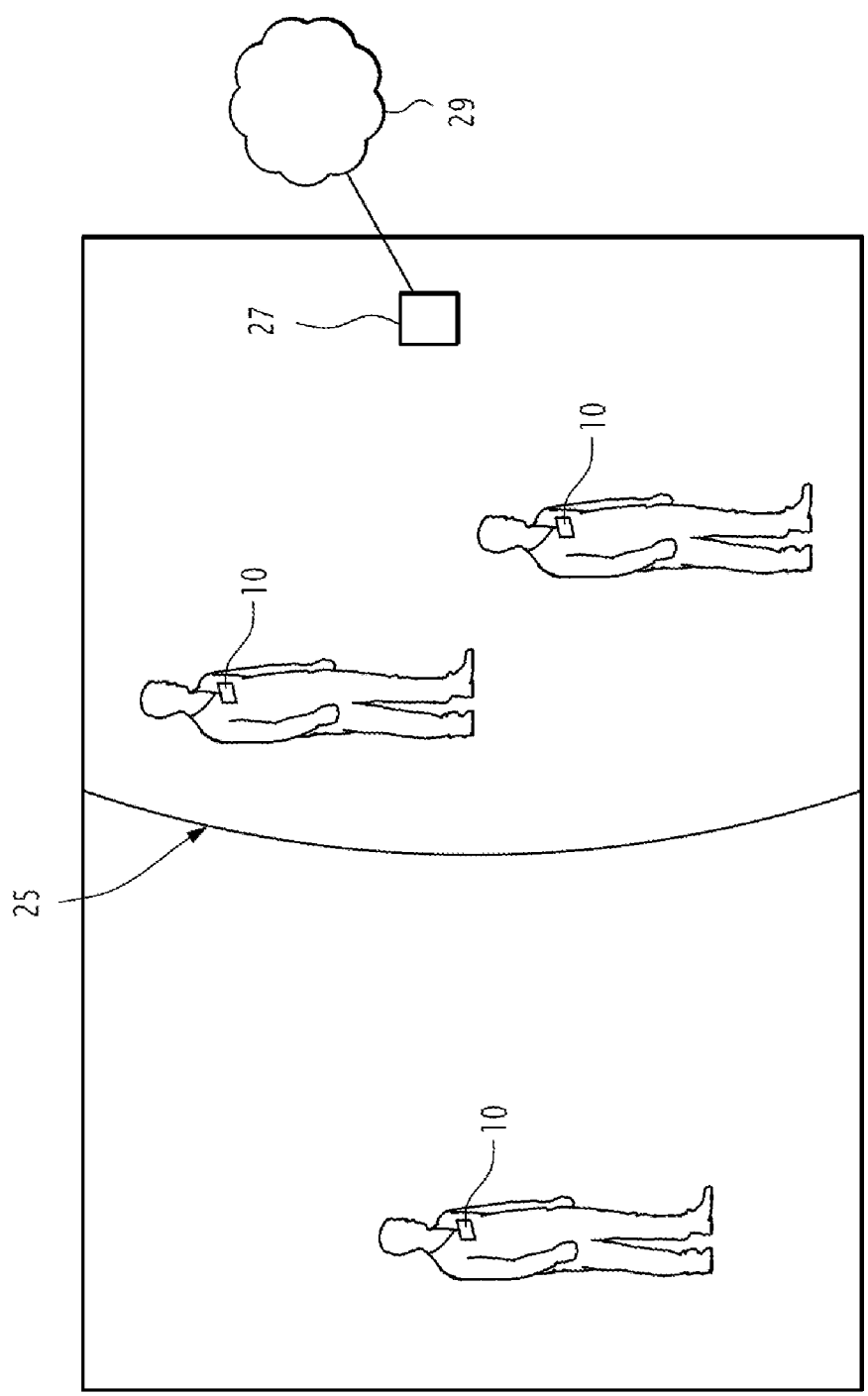
FIG. 2 is a simplified schematic representation of a public meeting with participant having electronic badges as shown in FIG. 1.
Figure 3:
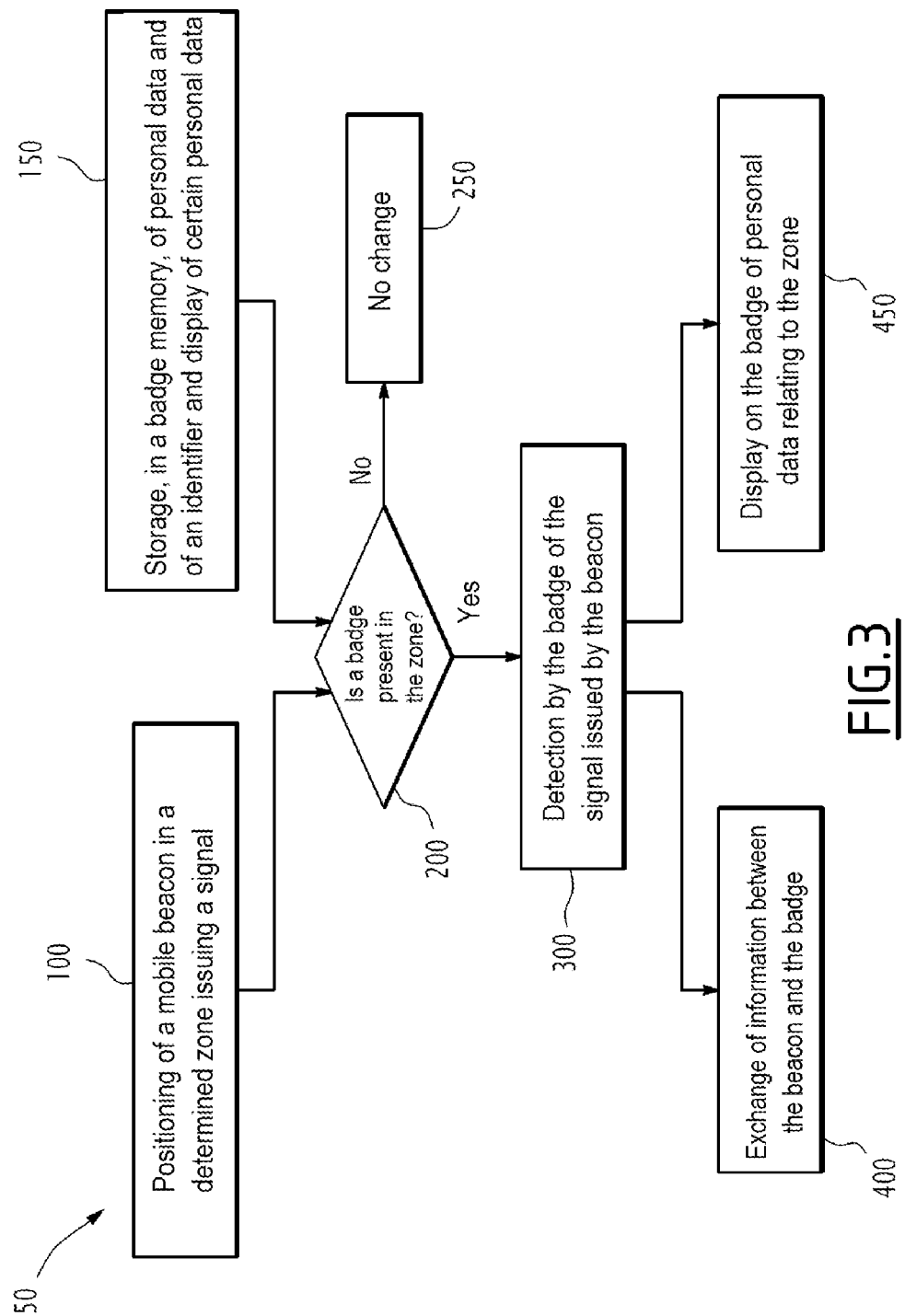
FIG. 3 is a diagram showing the communication method schematically shown in FIG. 2.

The communication method illustrated in FIGS. 1 to 3 is intended for being implemented in a public meeting.

A public meeting is a gathering of different players. The players are at least one organizer and at least one participant. The organizer plans at least one activity in the place of the public meeting to which the participant takes part.

The public meeting is e.g. either a trade or a non-trade show, a fair, a conference, a festival, and any other type of event bringing together a large number of people.

The method uses electronic identification badges 10, each associated with a participant.

The badge 10 is intended for being worn by the participant in a visible way. The badge allows the other participants to visually identify the person wearing the badge.

FIG. 1 shows an electronic badge 10 including a case 12 comprising internal components (not shown) and an external surface 14 visible in FIG. 1.

A fastening system, e.g. a cord, attached to the back of the case allows a participant to wear the badge 10 without any difficulty. The badge 10 can also be attached to the participant by means of a pin or by any other means.

The badge 10 includes a display 16 for displaying the personal data of the participant and/or information relating to the public meeting. The size of the display 16 is at least a few centimeters square, providing legibility for the participant's personal data displayed on the badge 10.

The display 16 is preferentially an electrophoretic display, so as limit the energy expended by the badge 10 for the display.

The personal data displayed by the badge 10 on the display 16 is in particular information enabling the participant to be identified, such as the surname, the first name, the photo or other elements which can appear on an identity document.

Furthermore, the personal data advantageously include one or a plurality of the following data: the coatroom number, the restaurant credits, the access rights of a participant, the list of contacts exchanged.

The case 12 also includes a memory in the internal components thereof. The memory stores the participant's personal data as well as the badge identifier 10.

The memory is controlled by a microprocessor integrated into the case 12. The personal data stored in the memory might be modified during the public meeting by the microprocessor.

The case 12 further includes a transmitter, transmitting an ultra-high frequency radio wave signal, preferentially by Bluetooth, over a short distance. The signal communicates the participant's identifier and personal data.

The use of such frequency band makes possible an independence of the electronic badge 10, from the internet connection at the place of the public meeting. Since the electronic devices exchanging information are close and little information is exchanged, the Bluetooth signal provides a guaranteed exchange of information.

The case 12 comprises a receiver for ultra-high frequency radio waves, similar to same sent by the transmitter.

The case 12 also includes a battery (not shown) electrically connected to the microprocessor, to the transmitter and to the receiver and providing the supply of electricity thereof. The battery has an autonomy of several hours, advantageously ten hours. The badge 10 is thus operational throughout the public meeting and is only charged between meetings.

The exterior surface 14 of the badge 10 comprises buttons 18 which can be actuated by pressure applied by the participant. The buttons 18 are electrically connected to the microprocessor analyzing the request and responding via the display 16.

In a variant, the display 16 is touch-sensitive and the participant interacts with the badge 10 by pressing directly on the display 16.

The outer surface 14 further includes a display 20 using light-emitting diodes (LEDs). The diodes have at least two display colors. The LED display 20 is battery powered and is controlled by the microprocessor.

FIG. 2 represents a public meeting with participants moving in a zone 25 wherein a beacon 27 is positioned.

The beacon 27 is a portable electronic device transmitting a signal locally in the zone 25, e.g. a portable telephone, a tablet, a portable computer or any other suitable electronic device.

The beacon 27 includes a case, and a memory in the case storing information about the public meeting.

Such information comprises in particular the identity of the participants, the personal data of the participants and the badge identifier associated thereto.

The beacon 27 also comprises a transmitter and a receiver (not shown).

The beacon 27 includes a battery, inside the case, connected to the other elements and supplying same with electricity.

The participants each wear a badge 10 displaying some of the participant's personal data which allows the other participants to identify said participant.

In a region of the public meeting, the beacon 27 is positioned issuing a signal in the zone 25 by means of the transmitter thereof. The signal issued by the beacon is similar to the signal issued by the badge. The beacon 27 issues ultra-high frequency radio waves, preferentially via Bluetooth. The advantages of Bluetooth are identical to the advantages mentioned for the badge 10.

The badges 10 situated in the zone 25 of the beacon 27 receive the signal from the beacon 27 and interact with the beacon.

Different zones 25 are thus distributed in the place of the public meeting in strategic places, in particular where the personal data of the participant needs to be shared.

The beacon 27 is configured for continually communicating with a database 29, in particular by means of an internet connection. The beacon 27 is configured for uploading the information coming from the memory of the beacon 27 into the database 29 and for checking that the information stored in the beacon 27 complies with the information of the database 29. The beacon is configured for modifying the memory of the beacon 27 so as to make same identical to the database 29, and/or to modify the database 29 so as to make same identical to the memory of the beacon.

When an information item diverges between the memory of the beacon 27 and the database, the microprocessor of the beacon analyzes the date of modification of the information item. The element of the database 29 or of the beacon 27 with the oldest modification date is updated based on the information contained in the element with the most recent modification date.

The memory present in the beacon 27 enables the beacon 27 to be independent in the event of an interruption of the internet connection. The beacon 27 thereby works under all circumstances.

The database 29 allows the participant to access the personal data thereof even after the public meeting without access to a badge 10. The participant has access to a personal space allowing them to access the personal data thereof present in the database 29.

The database 29 and all beacons 27 are configured for communicating continually, allowing an organizer to use any beacon 27 for communicating with a badge 10.

The information on all beacons 27 is thereby identical. More precisely, the database 29 and all the beacons 27 are configured so that, as soon as a beacon 27 updates information in its own memory thereof, the information is uploaded to the database 29 and then to all the other beacons 27.

FIG. 3 shows a flowchart of the operation of the communication method 50 between the beacon 27 shown in FIG. 2 and the badge 10 shown in FIG. 1.

The method 50 will now be described.

Beforehand, during a first step 100, the beacon 27 is placed in a determined zone 25 of the public meeting.

The privileged zones are e.g. the zone for receiving badges 10 or a zone giving access to an event reserved for certain participants.

Throughout the public meeting, the beacon 27 issues through the transmitter thereof a signal specific to the determined zone 25, containing e.g. a zone identifier.

The method further comprises a step 150 of storing in the memory of the participant's badge 10, the personal data of the participant, as well as the identifier thereof.

The badge 10 displays some of the participant's personal data, allowing other participants to identify said participant.

Said personal data is displayed on the badge 10 via the display 16.

Said personal data displayed are typically the name and photo of the participant.

In one embodiment, to save battery power, the personal data is not displayed permanently on the display 16 but is displayed by pressing a button 18 present on the badge 10.

During a step 200, the participant enters the zone 25 with the badge 10.

As long as the badge is outside the zone, the signal issued by the beacon 27 is too weak and nothing happens, the method 50 remaining in the step 250 as long as the badge 10 is not present in the zone 25.

The method comprises the following steps when the participant is in the zone 25.

During a step 300, the badge 10 detects the signal issued by the beacon 27.

The badge detects the signal using the receiver thereof, and the microprocessor thereof reads the identifier of the signal from the zone 25.

The method further comprises, when the badge 10 has detected the beacon 27, a step 400 for exchanging information between the beacon and the badge, and/or a step 450 for displaying, on the badge 10, personal data relating to the zone 25.

During the step 400, the badge 10 issues through the transmitter thereof, a signal containing the identifier of the participant. In the case of a zone 25 requiring personal data of the participant, the signal issued by the badge 10 in addition contains personal data of the participant.

In addition to or instead of the information transmitted by the badge, during the step 400, the exchange of information between the beacon 27 and the badge 10 advantageously comprises the transmission of information from the beacon 27 to the badge 10, for modifying the memory of the badge 10.

During the step 450, which occurs e.g. simultaneously with the step 400, the badge 10 displays the participant's personal data relating to the determined zone 25.

Such information is displayed using the display 16 and the LEDs thereof.

Different types of zones will now be described.

In the case of a zone 25 limiting access to certain participants, the beacon 27 is e.g. controlled by an organizer of the public meeting.

When the badge 10 receives the signal from the beacon 27, during the step 400, the badge 10 sends a signal including the identifier of the participant 10 as well as the access rights of the participant to the zone 25. At the same time, the microprocessor analyzes the identifier of the received area and determines according to the personal data of the participant stored in the memory, whether the participant has the right to access the zone 25.

If the participant has the right to access zone 25, during the step 450, the badge 10 lights up a green LED. Otherwise, the badge lights up a red LED using the LED display 20 thereof. The participant and the organizer thus have the visual information that the organizer should not allow the participant to pass.

The beacon 27 receives the signal from the badge 10 and compares the identifier of the badge 10 with the memory thereof and the database 29, so as to determine whether the participant has the right of access to the determined zone 25. Thereby, the organizer has, for all participants, the information about the access rights to the zone 25.

In the case where the organizer modifies the right of access to the zone 25 in the memory of a beacon 27, the database 29 is updated so as to be as per the memory of the beacon 27. The beacon 27 communicates such modification to the badge 10 by issuing a signal specific to the determined zone 25, further including the information of the change. The badge 10 receiving the information modifies the personal data contained in the memory, for updating said information.

The organization of the public meeting thereby has flexibility. On-site organizers are authorized to modify the authorizations immediately, according to the available places.

In the case of a coatroom zone 25, after receiving the signal characteristic of the zone 25, during the step 400, the badge 27 returns the identifier and the coatroom number thereof.

If the coatroom number is empty or has a zero value, the method 50 proceeds as follows. Once the badge 10 and the beacon 27 have exchanged the identifiers thereof, the beacon 27 sends a personal datum to the badge 10 to be stored, the coatroom number thereof. The transmission of the coatroom number passes through a signal identical to the signal used for communicating the identifier of the determined zone 25. Similarly, the badge 10 stores such personal datum in the memory thereof.

If the identifier is not empty or is not zero, the beacon 27 transmits the participant's coatroom number to the beacon 27 so that they can retrieve the belongings thereof.

In parallel, during the step 450, the badge 10 displays the coatroom number of the participant on the display 16 thereof. The beacon 27 sends a signal back to the badge 10, for updating the memory of the badge 10 with a new information item. The beacon 27 also uploads the information item into the database 29.

In the case of a restoration zone 25, the method 50 takes place in a similar way to the coatroom zone with a number of catering credits instead of a coatroom number.

In the case of an arrival zone 25, the participant does not yet have a badge 10 and an organizer using a beacon 27 initializes the badge 10 thereof. Such operation precedes the step 100.

By pressing at least one button 18 of the badge 10, the microprocessor of the badge 10 displays a bar code on the display 16 thereof. The organizer, using the beacon 27 integrating a barcode reader, scans the barcode on the display 16 of the badge 10. The beacon 27 thereby connects to the badge 10 and thereby recovers the identifier of the badge 10. The beacon 27 then transmits the participant's personal data contained in the beacon 27 or in the database 29. Once the operation is completed, the organizer gives the badge 10 to the participant. The beacon 27 then uploads the badge identifier into the database 29.

In the case of an exit zone 25, the participant returns the badge thereof to an organizer.

By pressing at least one button 18 of the badge 10, the microprocessor of the badge 10 places the badge 10 in a recovery mode. The badge 10 picks up the signal issued by the beacon 27 specific to the badge return, during the step 300. The badge 10 then transfers all the personal data to the beacon, during the step 400. The badge 10 is then in the returned state and, in order to be usable again, needs to be initialized according to the above method. The beacon 27 uploads all the information of the badge 10 into the database 29 and updates same.

In the case of an update zone 25, the badge 10 connects to a beacon 27, for updating the information with respect to the database 29. Once the identifier thereof has been exchanged, during the step 400, the beacon 29 transmits to the badge 10, the personal data of the badge 10, for a comparison by the microprocessor and for updating. The badge 10 transfers the personal data contained in the memory of the badge 10 to the beacon 27 which uploads same into the database 29.

In an update zone 25, the connection between a beacon 27 and a badge 10 is advantageously repeated only after a few minutes. After receiving the identifier of the badge 10, during the step 400, the beacon 27 stores in the memory thereof, the time of the last update and sends back a signal to the badge 10 only if the time of the last update is several minutes old.

The above saves the battery of the devices by avoiding the sending of dispensable signals.

In another embodiment, by pressing at least one button 18, the badges 10 send a signal containing the identifier thereof without necessarily the presence of a beacon 27 nearby. If at least two badges 10 are nearby and capture said signal, the badges 10 can connect to each other.

Once the ID thereof is exchanged, the badges 10 exchange personal data such as a name, a company and a business card. The badges store such personal data in the memory thereof. The exchange of personal data stops when at least one button 18 is released.

During the next connection with a beacon 27 in an update zone the personal data retrieved during the exchange with another badge 10 is transferred to the beacon 27 and then uploaded into the database 29.

The exchange of business cards by bringing the badges closer to one another and pressing one or a plurality of buttons 18 allows participants to quickly and easily exchange the contact information thereof and thereby enjoy the public meeting.

The communication method 50 has many advantages.

When the exchange of information between the beacon and the badge comprises the transfer of the participant ID through the badge to the beacon, the beacon is informed that the participant is present in the zone. The above allows the organizer to know at all times, the names of the participants present in the zone.

When the exchange of information between the beacon and the badge comprises the transmission of information from the beacon to the badge, for modifying the memory of the badge, the badge can thus be modified with the agreement of an organizer. For example, the organizer is thereby allowed to modify erroneous information on the participant's badge or further to add new access rights to the participant. The method is thereby more apt to react to a situation.

When the beacon uploads participant information to a database, said information is accessible from outside the public meeting. In this way, a participant can retrieve such information even when the public meeting is over.

When the badge transfers the participant's personal data to the beacon, in particular access rights to the specified zone, the information is shared with the organizer who uses the beacon. Such sharing of information facilitates interactions between the participant and the organizer.

When the badge has a display on which the participant's personal data is displayed, the badge is very convenient to use. The display displays at least the participant's identification data. The badge becomes easily reusable.

The badge initialization procedure makes it very easy to assign a badge to a participant.

When the determined zone is an access control zone, the signal issued by the beacon containing the identifier of the place, the badge after reception of the beacon signal displaying as personal data, information relating to the participant's right of access to said zone, the check of access of the participant being much easier. The organizer using the beacon can conveniently understand, visually, which participants are authorized to access the zone. The organizer just has to observe the badges of the participants.

When the badge has a microprocessor-controlled LED in the electronic badge, since the color of the LED characterizes the participant's access right to the zone, the organizer simply has to look at the color of the LED to assess whether the participant can access the zone.

The badge return procedure is also very convenient.

Badges can easily be used to exchange personal data, such as business cards, between two participants.

The method of the invention can also be used for managing catering credits very conveniently.

The communication method 50 thus has the advantage of speeding up many steps of a public meeting. The visual communication of the badge after entering a zone quickly informs the organizers on site.

The participants also have access to an interactive badge 10 informing same of the course of the public meeting. The participants can also easily check the information entered by the badge 10 thereof.

The information stored in the badge 10 can be modified using the beacons 27 and which provides flexibility for the organizers and for the participants.

The display using a display 16 also provides a clear and visible content.

The badges 10 can be returned and reused, which reduces the waste and the cost of producing new badges 10 at each new public meeting.

The invention claimed is:

1. A communication method for a public meeting using electronic identification badges each associated with a participant, the method comprising:
   positioning of a respective mobile beacon in one or more determined zones of the public meeting, the beacon issuing in the determined zone, an issued signal specific to the determined zone, the one or more determined zones comprising a badge return zone;
   storing, in a memory of the badge of each participant, an identifier and personal data of the participant, the badge displaying some of the personal data of the participant allowing the other participants to identify the participant; and
   when the participant is in the determined zone:
      detecting, by the badge, the signal issued by the beacon; and
      when the badge has detected the beacon, exchanging information between the beacon and the badge, or displaying on the badge personal data relating to the zone,
the method further comprising in the badge return zone:
   transferring, by the badge to the beacon, personal data of the participant;
   uploading, by the beacon, the participant-related data to a database; and
   following the uploading of the participant-related data from the beacon to the database, placing the badge in a returned state, the returned state requiring initialization before the next use of the badge.

2. The communication method according to claim 1, wherein said exchanging information comprises transferring the participant's identifier by the badge to the beacon.

3. The communication method according to claim 1, wherein the personal data comprises a name and a photo of the participant.

4. The communication method according to claim 1, wherein said exchanging information comprises transmitting information from the beacon to the badge, for modifying the memory of the badge.

5. The communication method according to the claim 4, wherein the one or more determined zones further comprise a coatroom and the information transmitted from the beacon in the coatroom to the badge comprises a coatroom ticket number for being written into the badge memory as personal data.

6. The communication method according to claim 4, wherein the one or more determined zones further comprise a catering reception zone, the information transmitted from the beacon to the badge containing a catering credit for being written into the badge memory as personal data.

7. The communication method according to claim 1, wherein the one or more determined zones further comprise a controlled access zone, the signal issued by the beacon in the controlled access zone containing an identifier of a location, the method further comprising:
   transferring, by the badge to the beacon in the controlled access zone, personal data of the participant; and
   displaying, by the badge after receiving the signal from the beacon, as personal data, information relating to the access right of the participant to the controlled access zone.

8. The communication method according to claim 7, wherein the badge includes an LED controlled by a microprocessor in the electronic badge, a color of the LED characterizing the access right of the participant to the zone.

9. The communication method according to claim 7, wherein the personal data of the participant transferred by the badge to the beacon in the controlled access zone comprises the access rights of the participant to the controlled access zone.

10. The communication method according to claim 1, wherein the badge includes a display on which the personal data of the participant is displayed.

11. The communication method according to claim 10, wherein the one or more determined zones further comprise an initialization zone of the badge, the badge being initialized before said storing, subsequent to:
   displaying a barcode on the display;
   scanning of the barcode by a barcode reader integrated into the beacon in the initialization zone; and
   transmitting personal data from the beacon in the initialization zone to the badge.

12. The communication method according to claim 1, wherein, prior to the positioning of a mobile beacon, at least two badges exchange data by:
   bringing the at least two badges closer to one another;
   issuing, by each badge, a badge identification signal;
   intercepting, by each badge, signals from other nearby badges;
   once the at least two signals have been detected, exchanging personal data between the at least two badges; and
   storing in memory the personal data exchanged in the memory of the badges.

13. The communication method according to claim 12, wherein the personal data exchanged between the at least two badges are virtual business cards.

\* \* \* \* \*